US012510944B2

(12) United States Patent
Tang et al.

(10) Patent No.: US 12,510,944 B2
(45) Date of Patent: Dec. 30, 2025

(54) COMPUTING DEVICE NOISE CONTROL

(71) Applicant: Hewlett-Packard Development Company, L.P., Spring, TX (US)

(72) Inventors: Yun David Tang, Spring, TX (US); Nick Thamma, Spring, TX (US); Hui Leng Lim, Spring, TX (US); Yi Ying Lai, Taipei (TW); Davis Matthew Castillo, Spring, TX (US); Pei Hsuan Li, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 48 days.

(21) Appl. No.: 18/560,521

(22) PCT Filed: Jun. 10, 2021

(86) PCT No.: PCT/US2021/036710
§ 371 (c)(1),
(2) Date: Nov. 13, 2023

(87) PCT Pub. No.: WO2022/260666
PCT Pub. Date: Dec. 15, 2022

(65) Prior Publication Data
US 2024/0248520 A1 Jul. 25, 2024

(51) Int. Cl.
*G06F 1/32* (2019.01)
*G06F 1/20* (2006.01)
*G06F 1/3231* (2019.01)
*G06F 1/3287* (2019.01)

(52) U.S. Cl.
CPC ............ *G06F 1/206* (2013.01); *G06F 1/3231* (2013.01); *G06F 1/3287* (2013.01)

(58) Field of Classification Search
CPC ....... G06F 1/206; G06F 1/3231; G06F 1/3287
See application file for complete search history.

(56) References Cited

U.S. PATENT DOCUMENTS

| 8,812,831 | B2 | 8/2014 | Cheng et al. | |
|---|---|---|---|---|
| 9,436,241 | B2 | 9/2016 | Tang et al. | |
| 2003/0220721 | A1* | 11/2003 | Cohen | G06F 1/3203 700/301 |
| 2005/0010331 | A1* | 1/2005 | Taylor | G05D 1/0274 318/568.12 |
| 2006/0193113 | A1* | 8/2006 | Cohen | G06F 1/203 361/679.48 |
| 2008/0112571 | A1* | 5/2008 | Bradicich | H05K 7/20727 381/73.1 |

(Continued)

FOREIGN PATENT DOCUMENTS

| JP | 2003-345465 A | 12/2003 |
|---|---|---|
| JP | 2017-010287 A | 1/2017 |
| WO | 2020/236157 A1 | 11/2020 |

*Primary Examiner* — Zahid Choudhury
(74) *Attorney, Agent, or Firm* — Quarles & Brady LLP

(57) ABSTRACT

An example device comprises: a surface-type sensor to detect a type of surface on which the device is located; a proximity sensor; and a processor. The processor is to: in response to detecting, using the surface-type sensor, that the device is located on a soft-type surface, increase noise output of the device; and, in response to detecting, using the proximity sensor, that a plurality of persons are proximal the device, decrease the noise output of the device.

20 Claims, 6 Drawing Sheets

(56) References Cited

U.S. PATENT DOCUMENTS

| | | |
|---|---|---|
| 2011/0251733 A1 | 10/2011 | Atkinson et al. |
| 2013/0130610 A1* | 5/2013 | Unno .................. G06F 1/20 |
| | | 454/184 |
| 2017/0219240 A1 | 8/2017 | Cassini et al. |
| 2020/0033920 A1 | 1/2020 | Nielsen et al. |
| 2020/0110451 A1* | 4/2020 | He .................... G06F 1/1684 |
| 2021/0157375 A1* | 5/2021 | Drewery ............ H05K 7/20209 |

* cited by examiner

COMPUTING DEVICE NOISE CONTROL

BACKGROUND

Computing devices, such as laptops, can create noise. For example, when a user is using a laptop, cooling components at the laptop, such as fans, and the like, may be used to cool the laptop, which can generate noise. However other components of a laptop, such as speakers, and the like, may also generate noise

BRIEF DESCRIPTION OF THE DRAWINGS

Reference will now be made, by way of example only, to the accompanying drawings in which.

DETAILED DESCRIPTION

Figure 1:
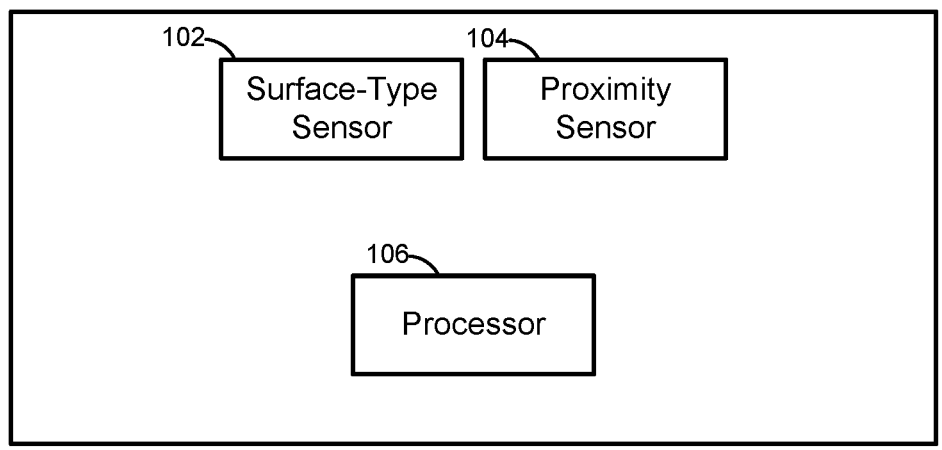
FIG. 1 is a schematic view of an example computing device for noise control.

Computing devices, such as laptops, can create noisy environments in work-from-home settings or open workspace settings and the like. For example, when a user is using a laptop, cooling components at the laptop, such as fans, and the like, may be used to cool the laptop, which can generate noise, though other components of a laptop, such as speakers, and the like, may also generate noise. While the noise may not be distracting to a user of laptop, such noise may be distracting to others near the laptop who may, for example, be on a conference call (e.g. using their own laptop), and the like, watching television, or performing some other activity where noise from the laptop used by the user is distracting.

Furthermore, when a laptop, or other computing device, is used on a soft surface, cooling vents may be blocked, which may cause the laptop to heat up, and a speed of a fan of the laptop may be increased, which may further exacerbate the noise problem. Conversely, when the speed of the fan of the laptop is only increased when excess heat is detected (e.g. due to blocking of cooling vents), damage may occur to the laptop if the increased fan speed is not sufficient to cool the laptop.

Hence, provided herein are computing devices (e.g. hereafter a devices, in the plural, or a device in the singular) that include a surface-type sensor to detect a type of surface on which a device is located. In particular, the surface-type sensor may detect that a device is located on a soft-type surface and may comprise a motion sensor, a gyroscope, an accelerometer, or a combination thereof. Soft-type surfaces are described in more detail below, but may be understood to include, but are not limited to, beds, cushioned furniture, blankets, laps of users, and the like, on which a device may be placed when used by a user (e.g. also referred to hereafter as an operator). In particular, the devices provided herein further include a processor to: in response to detecting, using a surface-type sensor, that a device is located on a soft-type surface, increase noise output of the device. For example, when a device is on a soft-type surface, such a soft-type surface may block, or partially block, a cooling vent of the device, and hence the device may detect being located on a soft-type surface using a surface-type sensor and increase a speed of a fan (e.g. a cooling fan) of the device, which may result in increased noise output, but which also proactively increases cooling at the device.

As such, the devices provided herein further include a proximity sensor, and the processor is understood to be further to: in response to detecting, using the proximity sensor, that a plurality of persons are proximal a device, decrease the noise output of the device. The plurality of persons may be understood to include a user or operator of a device, and another person proximal the device who may be distracted by the noise output of the device; as such, noise output of the device is generally decreased when another person (e.g. in addition to an operator of the device) is proximal the device. In particular, proximity sensors provided herein may comprise a charge sensor, a capacitance sensor, a non-camera proximity sensor, or a combination thereof. Indeed, such charge sensors or capacitance sensors do not rely on images from a camera to detect proximity of persons, but rather rely on changes in charge to detect proximity of persons. As such, detection of proximity of a plurality of persons does not rely on a line-of-site detection, as would occur with detection of proximity using cameras.

An aspect of the present specification provides a device comprising: a surface-type sensor to detect a type of surface on which the device is located; a proximity sensor; and a processor to: in response to detecting, using the surface-type sensor, that the device is located on a soft-type surface, increase noise output of the device; and, in response to detecting, using the proximity sensor, that a plurality of persons are proximal the device, decrease the noise output of the device.

Another aspect of the present specification provides a method comprising: in response to detecting, at a computing device, using a surface-type sensor of the computing device, that the computing device is located on a soft-type surface, changing an operation of a fan to a first mode; and, in response to detecting, at the computing device using a proximity sensor of the computing device, a plurality of persons proximal to the computing device, changing the operation of the fan from the first mode to a second mode based on ambient noise as detected by a noise sensor of the computing device.

Yet another aspect of the present specification provides a non-transitory computer-readable medium comprising instructions that, when executed by a processor of a computing device, cause the processor to: in response to determining, using a surface-type sensor, that the computing device is on a soft-type surface, control a cooling component of the computing device to enter a first mode that increases a throughput of the cooling component; in response to determining, using a proximity sensor, proximity of a plurality of persons to the computing device, control the cooling component to enter a second mode that decreases the throughput of the cooling component; and in response to determining, using the surface-type sensor, that the computing device is on a hard-type surface, control the cooling component to enter a third mode that decreases the throughput of the cooling component.

Attention is next directed to FIG. 1 which depicts a block diagram of an example computing device 100 that is generally to control noise. The computing device 100 (hereafter the device 100) may include, but is not limited to, a laptop device, a notebook device, a tablet device, a portable device, combinations thereof (e.g., a laptop device with a foldable keyboard to transform the laptop device into a tablet device), or any suitable device or computing device which may be used on a soft-type surface (or a hard-type surface) by an operator thereof. While only certain components the device 100 are depicted, it is understood that the device 100 may include any suitable combination of components to provide the device 100 with any suitable functionality. In particular, while not depicted, the device 100 may include in input device, such as a keyboard, and the like, and a noise-making component, such as a fan, a speaker, or a combination thereof or any other suitable noise making component. In particular, examples described hereafter will refer to the device 100 including a keyboard and a fan to cool the device 100, though the device 100 may include any other suitable components in addition to a keyboard and a fan or in place of a keyboard or in place of a fan.

As depicted, the device 100 include: a surface-type sensor 102 to detect a type of surface on which the device 100 is located; a proximity sensor 104; and a processor 106.

For example, the surface-type sensor 102 may include, but is not limited to, a motion sensor, a gyroscope, an accelerometer, or a combination thereof, and the like. For example, a motion sensor may include any suitable sensor, or combination of sensors (e.g. combinations of gyroscopes and accelerometers), for detecting motion of the device 100, and which may be used to detect whether the device 100 is on a soft-type surface or a hard-type surface. In particular, the surface-type sensor 102 may detect motion of the device 100 as an operator operates a keyboard of the device 100. On a soft-type surface, such as a bed, blankets, cushioned furniture, a lap of an operator, and the like, motion of the device 100 (e.g. as an operator operates a keyboard, and the like), may cause first particular sensor data to be generated at the surface-type sensor 102. In particular, when an operator of the device 100 uses the device 100 on a soft-type surface, the surface-type sensor 102 generally detects motion of the device 100, for example as the device 100 rocks or moves back and forth on the soft-type surface; such motion may occur when a keyboard (or other input device, and the like) is operated or such motion may occur merely by the device 100 being located on the soft-type surface.

In contrast, on a hard-type surface, such as a desk, a table, and the like, motion of the device 100 (e.g. or a lack of motion of the device 100) as an operator operates a keyboard, and the like, may cause a second particular sensor data to be generated at the surface-type sensor 102. In particular, when an operator of the device 100 uses the device 100 on a hard-type surface, motion of the device 100, as detected by the surface-sensor, may be smaller relative to the use of the device 100 on a soft-type surface or different relative to the use of the device 100 on a soft-type surface.

Hence, in general, the processor 106 is understood to identify, or distinguish between, the first particular sensor data, generated at the surface-type sensor 102 when the device 100 is on (or operated on) a soft-type surface, and the second particular sensor data, generated at the surface-type sensor 102 when the device 100 is on (or operated on) a hard-type surface. For example, the processor 106 may execute instructions, r an application, and the like (e.g. which may be stored at a memory, not depicted), which enables the processor 106 to identify, or distinguish between, the first particular sensor data and the second particular sensor data from the surface-type sensor 102. In particular, such an application may include, but is not limited to, numerical algorithms used to identify, or distinguish between, soft-surface signatures and hard-surface signatures of sensor data from the surface-type sensor 102. Alternatively, such an application may include, but is not limited to, a machine learning algorithm, or a supervised machine learning algorithm, trained to identify, or distinguish between, the first particular sensor data and the second particular sensor data. For example, such a machine learning algorithm may be trained to identify when the device 100 is located on soft-type surface, or a hard-type surface, using sensor data from the surface-type sensor 102 and training data indicating whether such sensor data is for a soft-type surface or a hard-type surface.

Regardless, the processor 106 is to: in response to detecting, using the surface-type sensor 102, that the device 100 is located on a soft-type surface, increase noise output of the device 100.

In particular, the processor 106 may be a general-purpose processor or controller or special purpose logic, such as a microprocessor or microcontroller (e.g. a central processing unit (CPU) or a graphics processing unit (GPU) an integrated circuit or other circuitry), an application specific integrated circuit (ASIC), a Field Programmable Gate Array (FPGA), a programmable array logic (PAL), a programmable logic array (PLA), a programmable logic device (PLD), and the like. Hence, the processor 106 may be implemented as a combination of hardware (e.g. a CPU, a GPU, etc.) and software (e.g., programming such as machine- or processor-executable instructions, commands, or code such as firmware, a device driver, programming, object code, etc. as stored on hardware). Alternatively, the processor 106 may be implemented as a hardware element with no software elements (e.g. such as an ASIC, an FPGA, a PAL, a PLA, a PLD etc.).

In some examples, the processor 106 may further implement or comprise or at least partially comprise, a basic input/output system (BIOS). As used herein, a BIOS refers to hardware or hardware and instructions to initialize, control, or operate a computing device (e.g. such as the device 100) prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

Returning to the device 100, it is understood that a fan or another cooling component of the device 100 may emit noise. It is further understood that such noise increases as speed or throughout of the fan or another cooling component increases, and such noise decreases as speed or throughout of the fan or another cooling component decreases. For example, other cooling components, different from a fan, may include, but are not limited to, thermoelectric cooling components, such as a Peltier cooler, and the like.

As such, increased noise output may occur via the processor 106 controlling a fan, or another cooling component, to increase a speed or throughout thereof (e.g. increased revolutions per minute (RPM) or increased cooling rate or increased air throughput, or a combination thereof) to increase cooling at the device 100. However, such increased noise output may occur in any suitable manner, and may include controlling any suitable component of the device 100 to increase noise output thereof.

In examples, where the increased noise output occurs by the processor 106 increasing speed or throughout of a fan or another cooling component of the device 100, it is understood that cooling at the device 100 may proactively increase (e.g. cooling of the processor 106 may proactively increase) which may compensate for cooling vents of the device 100 being blocked, or partially blocked, by virtue of the device 100 being located on the soft-surface.

It is further understood, however, that by increasing speed or throughout of a fan or another cooling component of the device 100, temperature of the device 100 may not decrease, but may stay about constant or increase at a rate slower than when the speed or throughout of a fan or another cooling component of the device 100 is not increased (e.g. the cooling may be impaired by blocking of the cooling vents regardless of increasing speed of a fan, and the like).

In some examples, the processor 106 may be further to increase the noise output of the device 100 by increasing the noise output to a maximum noise output, a particular noise output, or a combination thereof. For example, a speed or throughout of a fan or another cooling component of the device 100 may be increased to a maximum speed or a particular speed, or a maximum throughout or a particular throughout, to achieve maximum cooling or particular cooling at the device 100.

It is further understood that the operator of the device 100 comprises a first person who may not be distracted by the increased noise output of the device 100. However, such increased noise output may be a distraction to a second person (e.g. in addition to the operator of the device 100) when the second person is proximal the device 100.

As such, the processor 106 is further to: in response to detecting, using the proximity sensor 104, that a plurality of persons are proximal the device 100, decrease the noise output of the device 100.

For example, such a plurality of persons may include the operator of the device 100 and a second person who approaches the device 100 or who may already be proximal the device 100. As such, the plurality of persons may include two persons or more than two persons. Furthermore, during detection of the plurality of persons, the first person operating the device 100 may stop operating the device 100 and the second person may start operating the device 100. Regardless, the proximity sensor 104 generates proximity data indicating that a plurality of persons are proximal the device 100.

The proximity sensor 104 may include, but is not limited to, a charge sensor, a capacitance sensor, a non-camera proximity sensor, or a combination thereof. In particular the proximity sensor 104 may comprise a sensor that operates independent of a line-of-site thereof, as may occur when a camera is used to detect proximity, such that the proximity sensor 104 may detect a plurality of persons proximal the device 100 regardless of respective locations the plurality of persons relative to the device 100. For example, a first person operating the device 100 may be at a front of the device 100 to operate a keyboard thereof (and hence in a field-of-view or line-of-site of a camera), but a second person may be located behind the device or at left or right side of the device 100, which may be out of a field-of-view or line-of-site of a camera.

Charge sensors or capacitance sensors may hence be used as the proximity sensor 104 to detect changes in charge proximal the device 100. For example, a person approaching the device 100, or entering a room where the device 100 is being operated, may cause changes in charge that are detectable by a charge sensor or a capacitance sensor. A particular example of a charge sensor, which may be used as the proximity sensor 104 includes, but is not limited to, a Qvar™ sensor which detects changes in electrostatic charges in air around the sensor by measuring electric potential induced by an electrostatic field at an electrode of the sensor. However any suitable charge sensor, capacitance sensor, or non-camera proximity sensor is within the scope of the present specification.

In a particular example, the device 100 may comprise a camera which may be used to detect the operator of the device 100 proximal the device 100 (e.g. using any suitable computer vision algorithm, and the like), and any suitable charge sensor, capacitance sensor, or non-camera proximity sensor which may be used to detect other persons proximal the device 100. Put another way, while the proximity sensor 104 may include a charge sensor, a capacitance sensor, a non-camera proximity sensor, or a combination thereof, the device 100 may further include a camera which may be used to assist the charge sensor, and the like, in detecting proximity of a plurality of persons.

Regardless of a type of the proximity sensor 104, the processor 106 decreases noise output of the device 100 in response to detecting a plurality of persons using the proximity sensor 104.

Hence, in general, the processor 106 is understood to identify, or distinguish between, first proximity data, generated at the proximity sensor 104 when one person is proximal the device 100 and second proximity data generated at the proximity sensor 104 when a plurality of persons (e.g. two persons or more than two persons) are proximal the device 100.

For example, the processor 106 may execute an application, which enables the processor 106 to identify, or distinguish between, the first proximity data and the second proximity data from the proximity sensor 104. In particular, such an application may include, but is not limited to, numerical algorithms used to identify, or distinguish between, one person signatures and plurality of person signatures of proximity data from the proximity sensor 104. Alternatively, such an application may include, but is not limited to, a machine learning algorithm trained to identify, or distinguish between, the first proximity data and the second proximity data from the proximity sensor 104. For example, such a machine learning algorithm may be trained to identify when one person is proximal to the device 100 using proximity data from the proximity sensor 104; similarly, such a machine learning algorithm may be further trained to identify when a plurality of persons are proximal to the device 100, using the proximity data from the proximity sensor 104.

Such detection of proximity may be threshold based. For example, when the proximity sensor 104 comprises a charge sensor, the charge sensor may detect a first charge (e.g. or electrostatic field) when only the operator of the device 100 is proximal the device 100, and such proximity data indicating the first charge is received at the processor 106. As a second person approaches the device 100, charge detected by the charge sensor may increase, which is also provided as proximity data to the processor 106. However a determination of proximity of a plurality of persons at the processor 106 may not occur until the detected charge increases above a threshold charge, which may be associated with a threshold distance from the device 100. As such, in some examples, the processor 106 may be further to the decrease the noise output of the device 100 when two of a plurality of persons are less than a threshold distance from the device 100, as detected by the proximity sensor 104. Such a threshold distance (or corresponding threshold charge) may be in a range of about 3 meters to about 10 meters from the device 100, or may be selected heuristically and stored at a memory (not depicted) of device 100.

In particular, such decreased noise output may occur via the processor 106 controlling the fan, or another cooling component, to decrease a speed or throughout thereof (e.g. decreased revolutions per minute (RPM) or decreased air throughput) which may result in decreased cooling at the device 100. However, such decreased noise output may occur in any suitable manner, and may include controlling any suitable component of the device 100 to decrease noise output thereof.

In another example, noise output by the device 100 may be controlled by controlling a speaker of the device. For example, a speaker of the device 100 may be at a bottom of the device 100 or a side of the device 100, and noise (e.g. sound) from the speaker may be blocked when the device 100 is on a soft-type surface. As such, the processor 106 may: in response to detecting, using the surface-type sensor 102, that the device 100 is located on a soft-type surface, increase noise output of the device 100 by increasing sound output by a speaker of the device 100. Such an increase in sound may compensate for the speaker being blocked by the soft-type surface.

However, such increased sound may be distracting to a second person proximal the device 100. As such, in these examples, the processor 106 may be further to: in response to detecting, using the proximity sensor 104, that a plurality of persons are proximal the device 100, decrease the noise output of the device 100 by decreasing sound output by the speaker of the device 100. In some examples, the processor 206 may decrease such sound output of the speaker to a minimum sound level (e.g. which may be configurable at the device 100). Furthermore, when the plurality of persons is no longer detected, the processor 106 may again increase noise output of the device 100 by increasing sound output by a speaker of the device 100.

Figure 2:
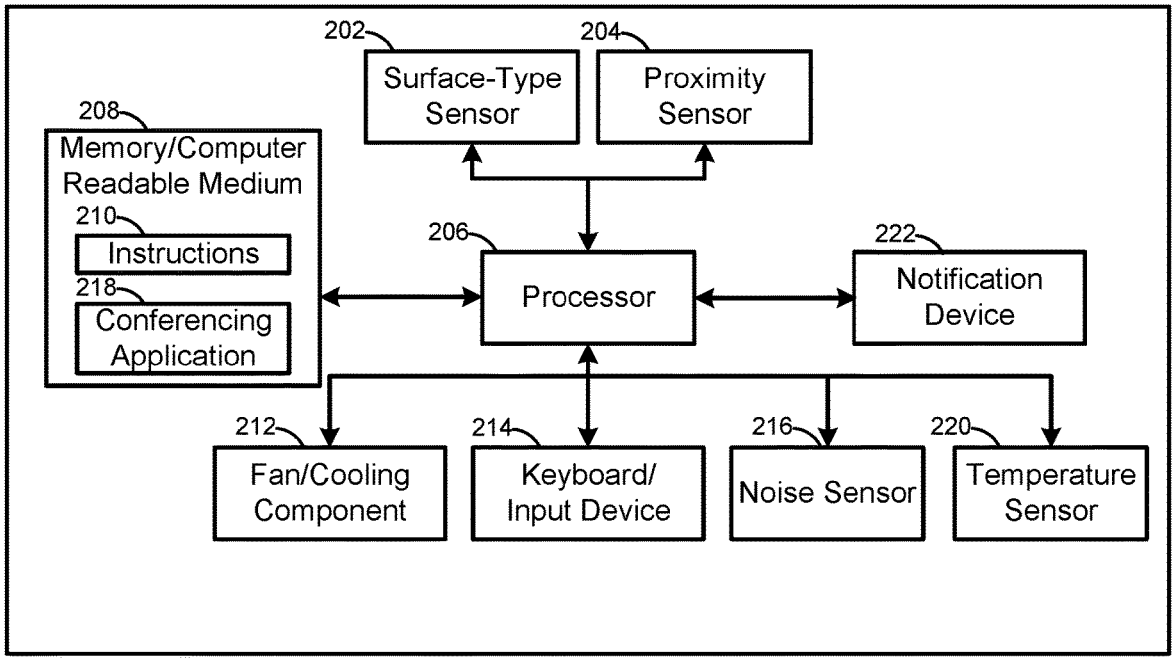
FIG. 2 is a schematic view of another example computing device for noise control.

Yet further features are within the scope of the present specification which are next described with respect to FIG. 2 which depicts a block diagram of another example device 200 that is generally to control noise. The device 200 is substantially similar to the device 100, with like components having like numbers, but in a "200" series rather than a "100" series. For example, the device 200 generally comprises a surface-type sensor 202, a proximity sensor 204 and a processor 206 which may implement similar functionality as respectively described above with respect to the surface-type sensor 102, the proximity sensor 104 and the processor 106

However, as depicted, the device 200 further comprises a memory 208 (or computer readable medium) comprising instructions 210 that, when executed by the processor 206, may cause the processor 206 to implement functionality as described herein. Furthermore, threshold values, maximum settings, minimum settings, and the like, as described herein, may also be stored at the instructions 210 or at the memory 208 separate from the instructions. Indeed, the instructions 210 may also comprise other applications or machine learning algorithms as described herein.

The memory 208 may include, but is not limited to, any suitable combination of a volatile computer-readable medium (e.g., volatile RAM, a processor cache, a processor register, etc.), a non-volatile computer-readable medium (e.g., a magnetic storage device, an optical storage device (e.g. a Digital Versatile Disc (DVD), a paper storage device, flash memory, read-only memory, non-volatile RAM, etc.), and the like.

Furthermore, the processor 206 and the instructions 210 may be used to implement a BIOS as described above.

As depicted, the device 200 further comprises a fan 212 or cooling component, a keyboard 214 or input device, and a noise sensor 216.

As previously described, the fan 212 or cooling component may be used to cool the device 200, but which may also emit noise. While hereafter examples are described with reference to a fan 212, it is understood that such examples may include operation of any suitable cooling component.

As also previously described, the keyboard 214 or input device may be operated by an operator of the device 200, causing the device 200 to move with a particular motion (e.g. as detected by the surface-type sensor 202) when the device 200 is located on a soft-type surface.

The noise sensor 216 may detect noise or a level of ambient noise or sound at the device 200, and may include a microphone, and the like.

In some of these examples, the processor 206 is to: in response to detecting, using the surface-type sensor 202, that the device 200 is located on a soft-type surface, change an operation of the fan 212, and the like, to a first mode; and, in response to detecting, using the proximity sensor 204, a plurality of persons proximal to the device 200, change operation of the fan 212 from the first mode to a second mode, which may be based on ambient noise as detected by the noise sensor 216.

For example, in the first mode, operation of the fan 212 may increase cooling at the device 200, but which also increases noise output at the device 200.

In the second mode, operation of the fan 212 may decrease cooling at the device 200 (e.g. relative to the first mode), but which also decreases noise output at the device 200 (e.g. relative to the first mode). The operation of the fan 212 in the second mode may be based on ambient noise as detected by the noise sensor 216. For example, the noise sensor 216 may detect ambient noise, and the processor 206 may change the operation of the fan 212 until noise from the fan 212 is at the level of the ambient noise or less than the level of the ambient noise. In particular, such an example may cause the operation of the fan in the second mode to decrease cooling, but to a higher level (and higher noise output) in a noisy room, and the like, as compared to a quieter room, and the like.

The processor 206 may be further to distinguish between ambient noise (e.g. not generated by the device 200), and noise generated by the device 200 (e.g. including, but not limited to, noise from the fan 212 or sound from a speaker, and the like). For example, the processor 206 may periodically (e.g. and briefly so as to not impede operation of the device 200) turn off noise-emitting components of the device 200 to measure ambient noise using the noise sensor 216.

In some examples, the processor 206 may be further to distinguish between noise from the fan 212, and noise or sound from other components of the device 200, such as a speaker, and the like. For example, the processor 206 may measure ambient noise, and then turn on the fan 212 and turn off other noise-emitting components of the device 200 to measure ambient noise and fan noise, using the noise sensor 216, to determine total noise, and subtract the ambient noise from the total noise to determine the fan noise. Noise from other noise-emitting components of the device 200 may be determined in a similar manner. Furthermore, such measured noise may be measured in decibels or any other suitable format.

Indeed, in general, the processor 206 may be further to increase or decrease noise output of the fan 212 as the ambient noise respectively increases or decreases (e.g. in first mode or the second mode), for example, to attempt to maintain greater cooling (and greater noise) as ambient noise increases, but decreasing noise (and cooling) as ambient noise decreases.

Furthermore, in some examples, the processor 206 is further to: in response to detecting, using the proximity sensor 204, that a plurality of persons are proximal the device 200, decrease the noise output of the device 200 by controlling the fan 212 to a minimum cooling setting or equal to the minimum cooling setting, for example to achieve at least a particular level of cooling at the device 200. Put another way, while the noise output at the device 200 may be decreased by decreasing a speed or throughput of the fan 212 or another cooling component at the device 200, such a decrease may occur in a manner that ensures a minimum level of cooling to both balance noise output and prevent the device 200 from overheating. The minimum cooling setting (e.g. a minimum fan speed, and the like) may be selected heuristically and stored at the instructions 210 or at the memory 208 separate from the instructions.

As depicted, the device 200 may further comprise a temperature sensor 220 which may monitor a temperature of the device 200 or the processor 206. In some examples, the processor 206 is further to: in response to detecting, using the proximity sensor 204, that a plurality of persons are proximal the device 200, decrease the noise output of the device 200 by changing operation of the fan 212 to a mode (e.g. such as the first mode), where noise reduced, and cooling may be reduced, but temperature is monitored via the temperature sensor 220. In these examples, the processor 206 is further to: when the temperature reaches a threshold temperature (e.g. the temperature rises to the threshold temperature), control the fan 212 to another mode where the temperature is controlled, or dynamically controlled, to be less than the threshold temperature. The threshold temperature may be heuristically selected to be a temperature that is below a given temperature above which damage to the device 200 or the processor 206 may occur or at which performance may be reduced.

Yet further features may be within the scope of the present specification. For example, as depicted, the memory 208 further stores a conferencing application 218, which may be executed by the processor 206 (e.g. together with the instructions 210). Such a conferencing application 218 may comprise an application for conducting conference calls (including, but not limited to, video-based conference calls) at the device 200, and the like. In these examples, the processor 206 may be further to: in response to determining that the ambient noise (e.g. as detected by the noise sensor 216) is above a threshold noise level (e.g. as stored at the memory 208 or the instructions 210), and that the device 200 is executing the conferencing application 218, control a notification device 222 to recommend lowering of the ambient noise.

For example, the notification device 222 may comprise a display screen, a speaker, or a combination thereof. When the ambient noise is above a threshold noise level (e.g. about 60 decibels or any other suitable value, which may be configurable at the device 200), the processor 206 may control the display screen to provide text, graphics, or a combination thereof, that recommends to an operator of the device 200 that the ambient noise be lowered to provide a better experience while using the conferencing application 218. Alternatively, or in addition, when the ambient noise is above the threshold noise level, the processor 206 may control the speaker to provide speech, or any other suitable sounds, that recommends to an operator of the device 200 that the ambient noise be lowered to provide a better experience while using the conferencing application 218.

Figure 3:
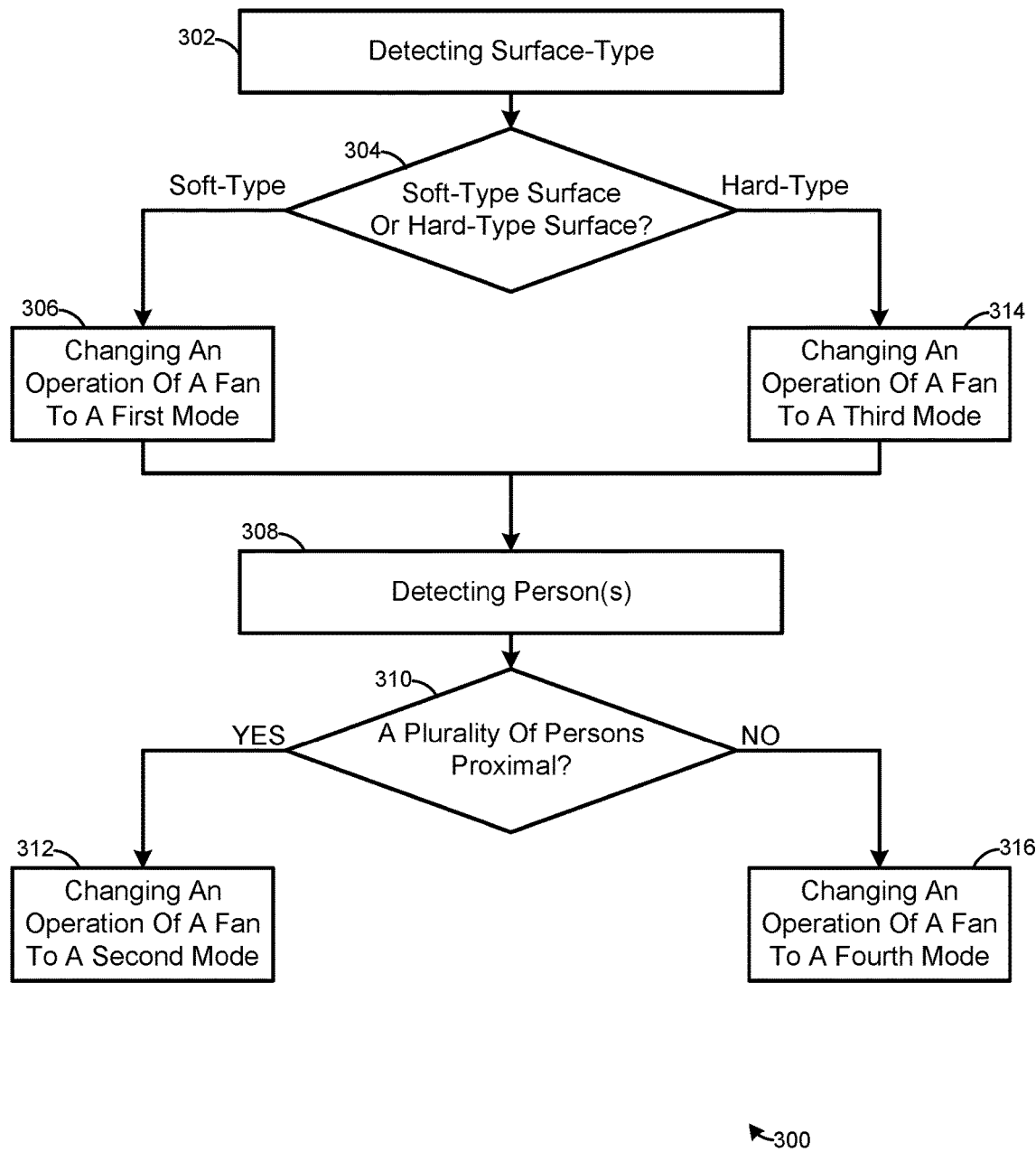
FIG. 3 is a flow diagram of an example method for noise control at a computing device.

Yet further features are within the scope of the present specification which are next described with respect to FIG. 3 which depicts a flow diagram of an example method 300 for noise control at a device. In order to assist in the explanation of method 300, it will be assumed that method 300 may be performed with the device 200, or the processor 206 thereof implementing the instructions 210. The method 300 may be one way in which the device 200 may be configured. Furthermore, the following discussion of method 300 may lead to a further understanding of the device 200, and its various components. Furthermore, it is to be emphasized, that method 300 may not be performed in the exact sequence as shown, and various blocks may be performed in parallel rather than in sequence, or in a different sequence altogether. Furthermore, it is to be emphasized that the method 300 may alternatively be performed with the device 100 or the processor 106 thereof.

Beginning at a block 302, the device 200 and/or the processor 206 detects a surface type on which the device 200 may be located by receiving sensor data from the surface-type sensor 202, as described above.

At a block 304, the device 200 and/or the processor 206 determines whether the device 200 is located on a soft-type surface or a hard-type surface based on the sensor data from the surface-type sensor 202.

In response to detecting, at the device 200 and/or the processor 206, using the surface-type sensor 102, that the device 200 is located on a soft-type surface, at a block 306, the device 200 and/or the processor 206 changes an operation of the fan 212 to a first mode. As described above, in some examples, in the first mode, the speed or throughput of the fan 212 may be increased to increase cooling of the device 200, which may also result in increased noise output from the fan 212. Detection of a hard-type surface will be described in more detail below.

At a block 308, the device 200 and/or the processor 206 detects a person or persons proximal to the device 200, for example using the proximity sensor 204 as described above.

In response to detecting, at the device 200 and/or the processor 206 using the proximity sensor 204, a plurality of persons proximal to the device 200 (e.g. a "YES" decision at the block 310), at a block 312 the device 200 and/or the processor 206 changes operation of the fan 212 from the first mode to a second mode. As described above, in some examples, in the second mode, the speed or throughput of the fan 212 may be decreased (e.g. relative to the first mode) to decrease noise output from the fan 212, which may also result in decreased cooling of the device 200.

As described above, in the second mode, the fan 212 may be controlled to decrease noise output based on ambient noise as detected by the noise sensor 216. As such, the device 200 and/or the processor 206 may receive noise sensor data from the noise sensor 216 indicative of a level of the ambient noise, and change the operation of the fan 212 until noise from the fan 212 is at a level of the ambient noise or less than the level of the ambient noise.

In yet further examples, in the second mode, the device 200 and/or the processor 206 may lower a volume of a speaker of the device 200 (e.g. as represented by the notification device 222 of FIG. 2), which may be in use via the conferencing application 218, so as to not disturb a second person (e.g. who is not operating the device 200) proximal the device 200. Alternatively, in the second mode, the notification device 222 of the device 200 may be controlled by the device 200 and/or the processor 206 to recommend the operator of the device 200 switch to a headset so as to not disturb a second person (e.g. who is not operating the device 200) proximal the device 200.

In additional examples, in the second mode, the speed or throughput of the fan 212 in the second mode may be decreased (e.g. relative to the first mode) based on a number of the plurality of persons that is sensed by the proximity sensor 204. For example, as a number of persons being sensed increases, the processor 206 may concurrently decrease the speed or throughput of the fan 212, such that noise of the fan 212 continues to decrease as a number of the plurality of persons increases. Hence, when three persons are sensed, the speed or throughput of the fan 212 may be controlled to be less noisy as compared to when two persons are sensed. Such decreasing of the speed or throughput of the fan 212 may, however, be to no lower than the minimum cooling setting or equal to the minimum cooling setting, as described above.

After the block 312, the device 200 may again implement the block 302 to again determine whether the device 200 remains located on a soft-type surface or has been moved to a hard-type surface.

Returning to the block 304, in response to detecting, at the device 200 and/or the processor 206 using the surface-type sensor 202, that the device 200 is located on a hard-type surface, at a block 314, the device 200 and/or the processor 206 changes the operation of the fan 212 to a third mode. For example, in the third mode, the fan 212 may be controlled to cool the device 200 based on a sensed temperature of the device 200 (e.g. using the temperature sensor 220, and the like, at the device 200), or based on processes which may be executed at the processor 206, or based on any other suitable indication that might indicate whether the device 200 is to be cooled. In the third mode, it is generally understood that cooling vents of the device 200 are not blocked. The block 308 may be implemented after the block 314 or, in some examples, after the block 308, the device 200 may again implement the block 302 to determine when the device 200 is located on a soft-type surface.

Returning to the block 310, in response to detecting, at the device 200 and/or the processor 206 using the proximity sensor 204, that the plurality of persons is no longer proximal to the device 200 (e.g. a "NO" decision at the block 310), at a block 316, the device 200 and/or the processor 206 changes the operation of the fan 212 to a fourth mode. The fourth mode may be the same, or similar to, the first mode of the fan 212 described above, or different from the first mode of the fan 212. Alternatively, the fourth mode may be the same, or similar to, the third mode of the fan 212 described above, or different from the third mode of the fan 212. Indeed, the fourth mode of the fan 212 may depend on whether the device 200 is located on a soft-type surface or a hard-type surface and, as such the fourth mode of the fan 212 may be dynamically selected based on whether the block 306 or the block 314 is implemented.

It is furthermore understood that the blocks of the method 300 may be performed at the device 200 and/or the processor 206 in any suitable order or in parallel or in conjunction with one another. For example, the block 308, at which persons are detected, may be performed prior to the block 302 in which a surface type is detected, or the blocks 302, 308 may be performed in parallel with one another.

Furthermore, the method 300 may further comprise the device 200 and/or the processor 206 implementing other features. For example, the method 300 may further comprise the device 200 and/or the processor 206 increasing or decreasing noise output of the fan 212 as the ambient noise (e.g. detected by the noise sensor 216) respectively increases or decreases, as described above.

Similarly, the method 300 may further comprise the device 200 and/or the processor 206, in response to determining that the ambient noise (e.g. detected by the noise sensor 216) is above a threshold noise level, and that the device 200 is executing the conferencing application 218, controlling the notification device 222 to recommend lowering of the ambient noise, as described above.

Similarly, the method 300 may further comprise the device 200 and/or the processor 206: determining that noise output from the fan 212 is lower than ambient noise, and that one person (e.g. the operator of the device 200) is proximal the device 200 (e.g. as detected by the proximity sensor 204); and in response, increase a volume of a speaker of the device 200 (e.g. as represented by the notification device 222 in FIG. 2), which may be in use via the conferencing application 218. In some of these examples, the volume of the speaker may be increased to above the ambient noise. In yet further examples, when the volume of speaker cannot be increased to above the ambient noise, or when the total noise from the speaker and the ambient noise exceeds a threshold value, the notification device 222 of the device 200 may be controlled by the device 200 or the processor 206 to recommend the operator of the device 200 lower the ambient noise or move to another (e.g. quieter) location.

In other examples, when a plurality of persons are detected (e.g. a second person approaches the device 200), the volume of the speaker may be lowered; alternatively, the notification device 222 of the device 200 may be controlled by the device 200 and/or the processor 206 to recommend the operator of the device 200 switch to a headset.

Furthermore, control of a speaker of the device 200, based on whether the device 200 is on soft-type surface or a hard-type surface, or based on whether one person or a plurality of persons are proximal the device may occur independent of control of the fan 212.

As mentioned above, the method 300 is generally implemented by way of the processor 206 executing the instructions 210 stored at the memory 208. Furthermore, in some examples, the memory 208 may comprise a non-transitory computer-readable medium. Furthermore, in some examples, a cooling component that is not a fan (e.g. such as a thermoelectric cooler) may be used to cool the device 200 (e.g. in place of the fan 212, or in combination with the fan 212). Hence, in some examples, the term "cooling component" as used herein may refer to any suitable cooling component, which may include the fan 212 or any other suitable cooling component.

Figure 4:
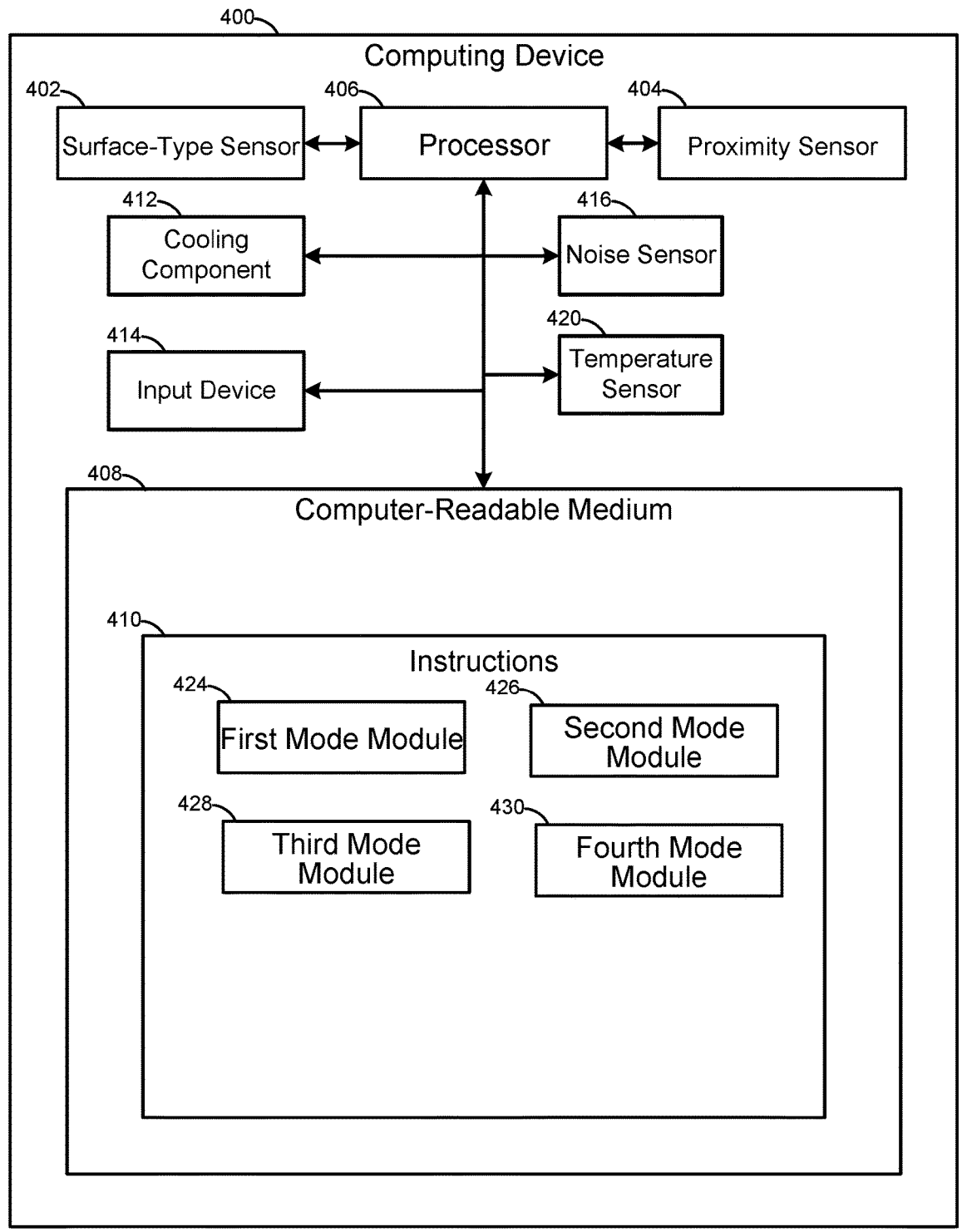
FIG. 4 is a schematic view of another example computing device for noise control.

Yet further features are within the scope of the present specification as next described with respect to FIG. 4 which depicts another example device 400 to control noise. The device 400 is substantially similar to the device 100 and/or the device 200, with like components having like numbers, but in a "400" series rather than a "100" series or a "200" series. As such, the device 400 includes a surface-type sensor 402, a proximity sensor 404, a processor 406, a non-transitory computer-readable medium 408 storing instructions 410, a cooling component 412, an input device 414, a noise sensor 416 and a temperature sensor 420, which are substantially similar to the surface-type sensor 202 (or the surface-type sensor 102), the proximity sensor 204 (or the proximity sensor 104), the processor 206 (or the processor 106), the memory 208 (e.g. in examples where memory 208 comprises a non-transitory computer-readable medium, the instructions 210, the fan 212 or any other suitable cooling component, the keyboard 214 or any other suitable input device, the noise sensor 216 and the temperature sensor 220. While not depicted, the device 400 may further comprise a conferencing application, similar to the conferencing application 218, and a notification device, similar to the notification device 222.

As such, also provided herein is a non-transitory computer-readable medium 408 comprising instructions 410 that, when executed by the processor 406 of the device 400, cause the processor 406 to implement functionality as described herein.

In particular, as depicted, the instructions 410 comprise a first mode module 424, a second mode module 426, a third mode module 428, and a fourth mode module 430. However, the instructions 410 may be provided in any suitable format or with any suitable number of modules In particular, the first mode module 424, when executed by the processor 406 of the device 400, causes the processor 406 to: in response to determining, using the surface-type sensor 402, that the device 400 is on a soft-type surface, control a cooling component of the device 400 to enter a first mode that increases a throughput of the cooling component. The first mode may be similar to the first mode described with respect to block 306 of the method 300, and throughput may refer to a speed or RPMs, a cooling rate or air flow, and the like, of the cooling component. Hence, for example, speed or RPMs or the cooling rate or airflow through the cooling component may be increased in the first mode.

Similarly, the second mode module 426, when executed by the processor 406 of the device 400, causes the processor 406 to: in response to determining, using the proximity sensor 404, proximity of a plurality of persons to the device 400, control the cooling component to enter a second mode that decreases the throughput of the cooling component. The second mode may be similar to the second mode described with respect to block 312 of the method 300 and hence, for example, speed or RPMs or the cooling rate or airflow through the cooling component may be decreased in the second mode.

Similarly, the third mode module 428, when executed by the processor 406 of the device 400, causes the processor 406 to: in response to determining, using the surface-type sensor 402, that the device 400 is on a hard-type surface, control the cooling component to enter a third mode that decreases the throughput of the cooling component. The third mode may be similar to the third mode described with respect to block 314 of the method 300 and hence, for example, speed or RPMs or the cooling rate or airflow through the cooling component may be decreased in the third mode.

Similarly, the fourth mode module 430 that, when executed by the processor 406 of the device 400, causes the processor 406 to: in response to detecting, using the proximity sensor 404, control the cooling component to enter a fourth mode that increases (or decreases) the throughput of the cooling component (e.g. increases or decreases respectively depending on whether the device 400 is a soft-type surface or a hard-type surface as detected by the surface-type sensor 402).

In some examples, the instructions 410 are further to cause the processor 406 to: determine that the device 400 is on the soft-type surface based on movement of the device 400 as detected by the surface-type sensor 402, as has been described above.

In further examples, the second mode module 426 (or another module) are further to cause the processor 406 to: determine proximity of the plurality of persons to the device 400 based on charge measured by the proximity sensor 404, as has been described above.

In further examples, the first mode module 424 (or another module) are further to cause the processor 406 to: in the first mode, control the cooling component to a maximum cooling setting (e.g. such that maximum throughput is achieved), as has been described above. For example, in the maximum cooling setting, the cooling component may be operated to a maximum speed or maximum RPMs or a maximum cooling rate or to achieve a maximum airflow. Such a maximum cooling setting may be predetermined and stored in the instructions 410 or at the first mode module 424 or at the non-transitory computer-readable medium separate from the instructions 410 or separate from the first mode module 424.

In yet further examples, the second mode module 426 or the third mode module 428 (or another module) are further to cause the processor 406 to: in the second mode or the third mode, control the cooling component to decrease cooling to greater than a minimum cooling setting or equal to the minimum cooling setting, as has been described above. For example, in the minimum cooling setting, the cooling component may be operated to a minimum speed or minimum RPMs or a minimum cooling rate or to achieve a minimum airflow. Such a minimum cooling setting may be predetermined and stored in the instructions 410 or the second mode module 426 or the third mode module 428, or at the non-transitory computer-readable medium separate from the instructions 410 or the second mode module 426 or the third mode module 428. Furthermore, the minimum cooling setting may be predetermined heuristically.

While not depicted, the module 424, the module 426, the module 428, or the module 430 may be further adapted to cause the processor 406 to implement temperature control the cooling component 412 further based on measurements by the noise sensor 416 or the temperature sensor 420, similar to as described above.

Figure 5:
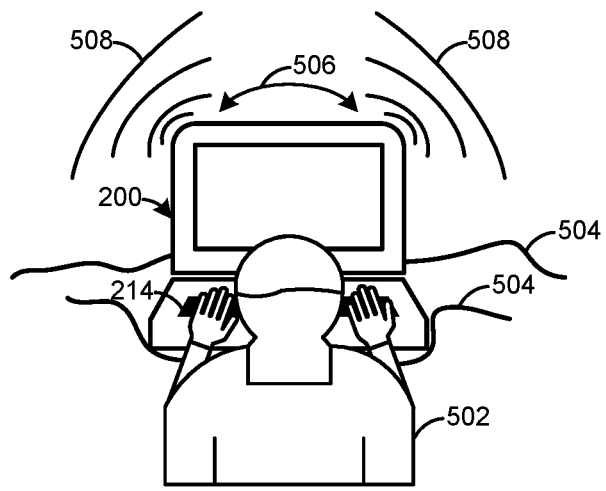
FIG. 5 depicts an example of noise control at a computing device when the computing device is located on a soft-type surface and one person is proximal the computing device.
Figure 6:
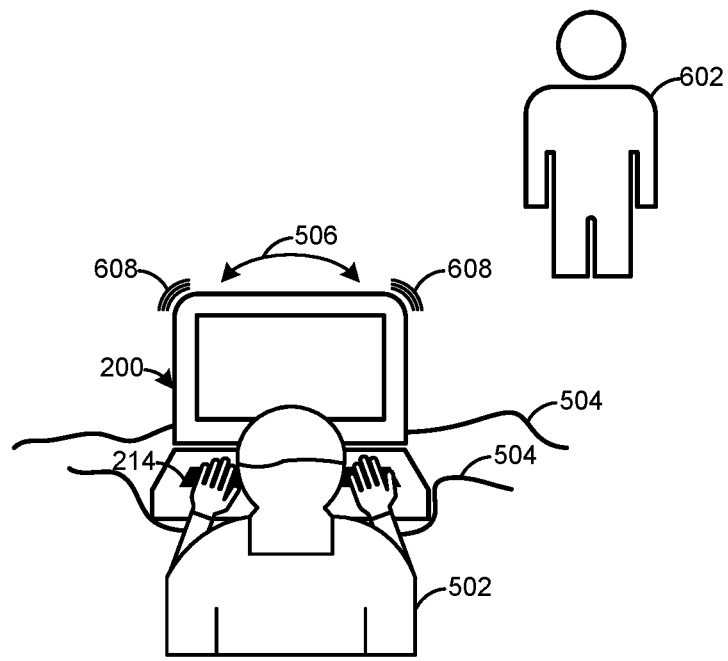
FIG. 6 depicts another example of noise control at a computing device when the computing device is located on a soft-type surface and a plurality of persons is proximal the computing device.

Attention is next directed to FIG. 5 and FIG. 6 which depict an example of certain aspects of the present specification. While only external components of the device 200 are depicted in FIG. 5 and FIG. 6, it is understood that the device 200 includes the internal components depicted in FIG. 2, or any other suitable components.

Attention is first directed to FIG. 5 which depicts an example of the device 200 provided in the form of a laptop, being operated by an operator 502 (e.g. a first person) on a soft-type surface 504 (e.g. such as a bed, or any other suitable soft-type surface).

For example, as depicted, the operator 502 is typing on the keyboard of the device 200, which causes the device 200 to move on the soft-type surface 504. For example, the device 200 may rock side-to-side on the soft-type surface 504 as indicated by an arrow 506. In general, the surface-type sensor 202, detects the movement indicated by the arrow 506 and provides sensor data to the processor 206 which detects such movement via the sensor data (e.g. the processor 206 which detects such movement via the surface-type sensor 202). As such, the processor 206 determines that the device 200 is on a soft-type surface (e.g. as described with respect to the block 304 of the method 300). As such, the processor 206 may control the fan 212 (or any other suitable cooling component) to a mode where cooling increases and noise output 508 increases (e.g. the first mode as described with respect to the block 306 of the method 300).

Attention is next directed to FIG. 6 which may follow, in time, from FIG. 5. In FIG. 6, a second person 602 has entered a room where the device 200 is located, and the processor 206 determines, using the proximity sensor 204, that a plurality of persons are proximal the device 200 (e.g. as described with respect to the block 310 of the method 300). As such, the processor 206 may control the fan 212 (or any other suitable cooling component) to a mode where cooling decreases and noise output 608 decreases (e.g. the second mode as described with respect to the block 312 of the method 300). Such a decrease in noise from the noise output 508 to the noise output 608 is represented by the lines of the noise output 508 being smaller than lines of the noise output 608.

While not depicted, it is understood that when the second person 602 is no longer proximal the device 200, the device 200 may again output noise as depicted as the noise output 508 of FIG. 5.

It should be recognized that features and aspects of the various examples provided above may be combined into further examples that also fall within the scope of the present disclosure.

The invention claimed is:

1. A device comprising:
a surface-type sensor to detect a type of surface on which the device is located;
a proximity sensor; and
a processor to:
in response to detecting, using the surface-type sensor, that the device is located on a soft-type surface, increase noise output of the device; and,
in response to determining, using the proximity sensor and a machine learning algorithm trained to identify data from the proximity sensor, that a plurality of persons are proximal the device, decrease the noise output of the device.

2. The device of claim 1, wherein the surface-type sensor comprises a motion sensor, a gyroscope, an accelerometer, or a combination thereof.

3. The device of claim 1, wherein the proximity sensor comprises a charge sensor, a capacitance sensor, a non-camera proximity sensor, or a combination thereof.

4. The device of claim 1, wherein the processor is further to increase the noise output of the device by increasing the noise output to a maximum noise output, a particular noise output, or a combination thereof.

5. The device of claim 1, wherein the processor is further to decrease the noise output of the device when two of the plurality of persons are less than a threshold distance from the device, as detected by the proximity sensor.

6. The device of claim 1, wherein the machine learning algorithm is further trained to identify whether the device is located on a soft-type surface, based on data from the surface-type sensor.

7. The device of claim 1, wherein the machine learning algorithm is further trained to fuse surface-type sensor data and proximity sensor data using a Decision Tree algorithm to determine an operational mode.

8. The device of claim 3, wherein the charge sensor is configured to detect changes in electrostatic charges in air around the sensor by measuring electric potential induced by an electrostatic field at an electrode of the sensor.

9. The device of claim 3, wherein the charge sensor is further configured to detect a first charge corresponding to a first individual proximal to the device, detect an increase in charge as a second individual approaches the device, compare the detected charge to a threshold charge associated with a predefined proximity distance, and determine, at the processor, that a plurality of individuals are proximal to the device when the detected charge exceeds the threshold charge.

10. A method comprising:
in response to detecting, at a computing device, using a surface-type sensor of the computing device, that the computing device is located on a soft-type surface, changing an operation of a fan to a first mode; and,
in response to detecting, at the computing device using a proximity sensor of the computing device, a plurality of persons proximal to the computing device via a machine learning algorithm trained to identify data from the proximity sensor, changing the operation of the fan from the first mode to a second mode based on ambient noise as detected by a noise sensor of the computing device.

11. The method of claim 10, further comprising: increasing or decreasing noise output of the fan as the ambient noise respectively increases or decreases.

12. The method of claim 10, further comprising: in response to detecting, at the computing device using the proximity sensor, that the plurality of persons are proximal to the computing device, changing the operation of the fan until noise from the fan is at a level of the ambient noise or less than the level of the ambient noise.

13. The method of claim 10, further comprising:
in response to detecting, at the computing device using the surface-type sensor, that the computing device is located on a hard-type surface, changing the operation of the fan to a third mode; or
in response to detecting, at the computing device using the proximity sensor, that the plurality of persons is no longer proximal to the computing device, changing the operation of the fan to a fourth mode.

14. The method of claim 10, further comprising: in response to determining that the ambient noise is above a threshold noise level, and that the computing device is executing a conferencing application, controlling a notification device to recommend lowering of the ambient noise.

15. The method of claim 10, wherein changing the operation of the fan from the first mode to the second mode based on ambient noise as detected by the noise sensor of the computing device includes causing operation of the fan until a noise from the fan is level with or less than a level of the ambient noise.

16. A non-transitory computer-readable medium comprising instructions that, when executed by a processor of a computing device, cause the processor to:

in response to determining, using a surface-type sensor, that the computing device is on a soft-type surface, control a cooling component of the computing device to enter a first mode that increases a throughput of the cooling component;

in response to determining, using a proximity sensor and a machine learning algorithm trained to identify data from the proximity sensor, proximity of a plurality of persons to the computing device, control the cooling component to enter a second mode that decreases the throughput of the cooling component; and in response to determining, using the surface-type sensor, that the computing device is on a hard-type surface, control the cooling component to enter a third mode that decreases the throughput of the cooling component.

17. The non-transitory computer-readable medium of claim 16, wherein the instructions are further to cause the processor to: determine that the computing device is on the soft-type surface based on movement of the computing device as detected by the surface-type sensor.

18. The non-transitory computer-readable medium of claim 16, wherein the instructions are further to cause the processor to: determine proximity of the plurality of persons to the computing device based on charge measured by the proximity sensor.

19. The non-transitory computer-readable medium of claim 16, wherein the instructions are further to cause the processor to: in the first mode, control the cooling component to a maximum cooling setting.

20. The non-transitory computer-readable medium of claim 16, wherein the instructions are further to cause the processor to: in the second mode or the third mode, control the cooling component to decrease cooling to greater than a minimum cooling setting or equal to the minimum cooling setting.

\* \* \* \* \*